Jan. 24, 1956 F. G. STEELE 2,732,504

LINEAR CAM COMPUTER

Filed Sept. 28, 1948 3 Sheets-Sheet 1

INVENTOR.
FLOYD G. STEELE
BY Herbert E. Metcalf
ATTORNEY

INVENTOR.
FLOYD G. STEELE
BY Herbert E. Metcalf
ATTORNEY

Jan. 24, 1956 F. G. STEELE 2,732,504

LINEAR CAM COMPUTER

Filed Sept. 28, 1948 3 Sheets-Sheet 3

INVENTOR.
FLOYD G. STEELE

BY
Herbert E. Metcalf
ATTORNEY

United States Patent Office 2,732,504

Patented Jan. 24, 1956

2,732,504

LINEAR CAM COMPUTER

Floyd G. Steele, Long Beach, Calif., assignor to Northrop Aircraft, Inc., Hawthorne, Calif., a corporation of California Application September 28, 1948, Serial No. 51,563

22 Claims. (Cl. 250—208)

This invention relates to linear cam function generators, and more particularly to a means and method of generating a function of an independent variable to obtain the dependent variable by means of a linear cam.

Heretofore, known mechanical means of generating a function, composed of screw cams, groove cams, surface cams, pin cams, or the like, required expensive machining of the parts to provide a high degree of accuracy. Furthermore, it is known that for generation of the more complicated functions, by such prior means, a high accuracy cannot be attained.

Among the objects of the present invention are:

To provide a means and method whereby the numerical value of a mathematical expression in two variables can be positively and accurately generated;

To provide such a novel function generator and linear cam computer that a relatively complicated mathematical expression in two variables can be inexpensively and accurately generated;

To provide a function generator that permits an easy and accurate setting of the value of the initial conditions;

To provide a function generator that can be adapted with a minimum of changes to generate other functions;

To provide a function generator that is not cumbersome or bulky;

To provide a function generator with a means of reversing the generating medium whereby cyclical or repeated portions of the function can be easily obtained.

Broadly stated, the present invention is comprised of a medium recorded with properly spaced discrete signals. The length of the medium traversed corresponds to the independent variable and the number of discrete signals recorded in that length corresponds to the dependent variable. The medium recording is incrementally driven past an associated scanning head which is adapted to sense the discrete signals recorded thereon and convey the resulting electrical effect to a positive or negative output channel. The summation of the signals in both these channels is equal to the numerical value of the function being generated.

This invention possesses numerous other objects and features, some of which, together with the foregoing, will be set forth in the following description of a preferred embodiment of the invention.

Figure 1:
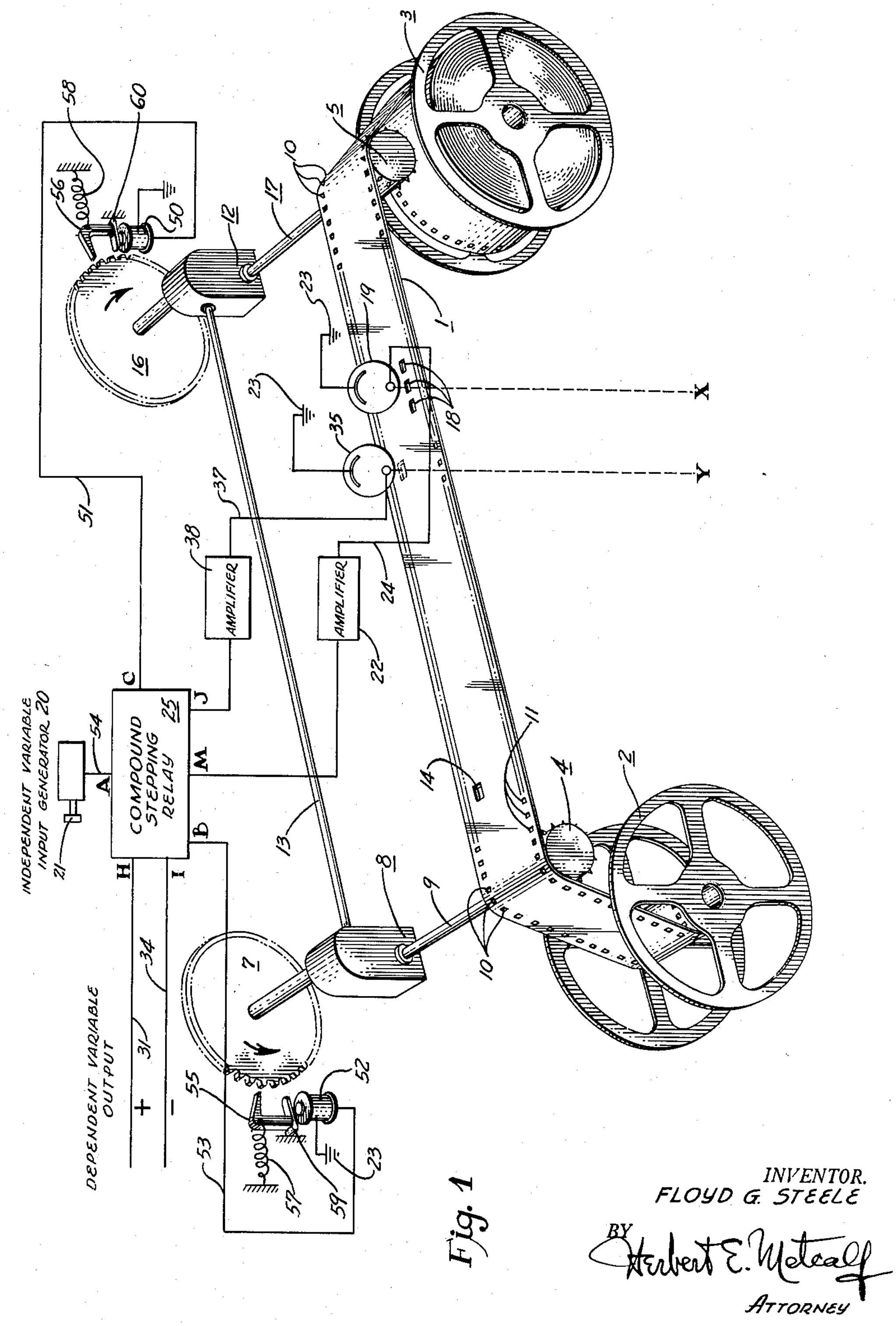
Figure 1 is a perspective, diagrammatic illustration of one embodiment of the invention together with a wiring diagram of certain parts thereof.

Referring first to Figure 1, a tape cam 1, which can be standard 35 mm. movie film, for example, is provided with front and rear conventional take up reels 2 and 3. The take up mechanism is omitted for clarity. These reels are arranged to pass the tape over the span formed by front and rear drive sprockets 4 and 5, respectively.

Front drive sprocket 4 is rotatably connected to a front stepping gear 7 through a front gear box 8 and a front sprocket shaft 9. Front drive sprocket 4 has a row of sprocket teeth 10 disposed around the circumference thereof at each end to mesh with sprocket holes 11 in the tape cam 1. Front gear box 8 has a right angle drive which is rotatably connected to an associated rear gear box 12 by means of a link shaft 13. Link shaft 13 is parallel to the longitudinal span of the tap cam and affords positive drive between the front and rear drive sprockets.

A rear stepping gear 16 drives rear drive sprocket 5 through rear gear box 12 and rear sprocket shaft 17. Rear drive sprocket 5 has teeth 10 thereon, similar to those on the front drive sprocket, also meshing with sprocket holes 11 of tape cam 1. Thus by means to be shown hereafter, the rear stepping gear 16 affords a positive forward incremental drive of the tape cam and the front stepping gear 7 affords a positive backward incremental drive of the tape cam.

Tape cam 1 is punched with a row of information or function holes 18. These holes are placed on the tape cam 1 at predetermined intervals depending on the information they represent. In this particular embodiment, the information holes 18 are spaced in the tape cam to represent the sine of an angle and the length of the tape cam traversed corresponds to the size of this angle.

Figure 2:
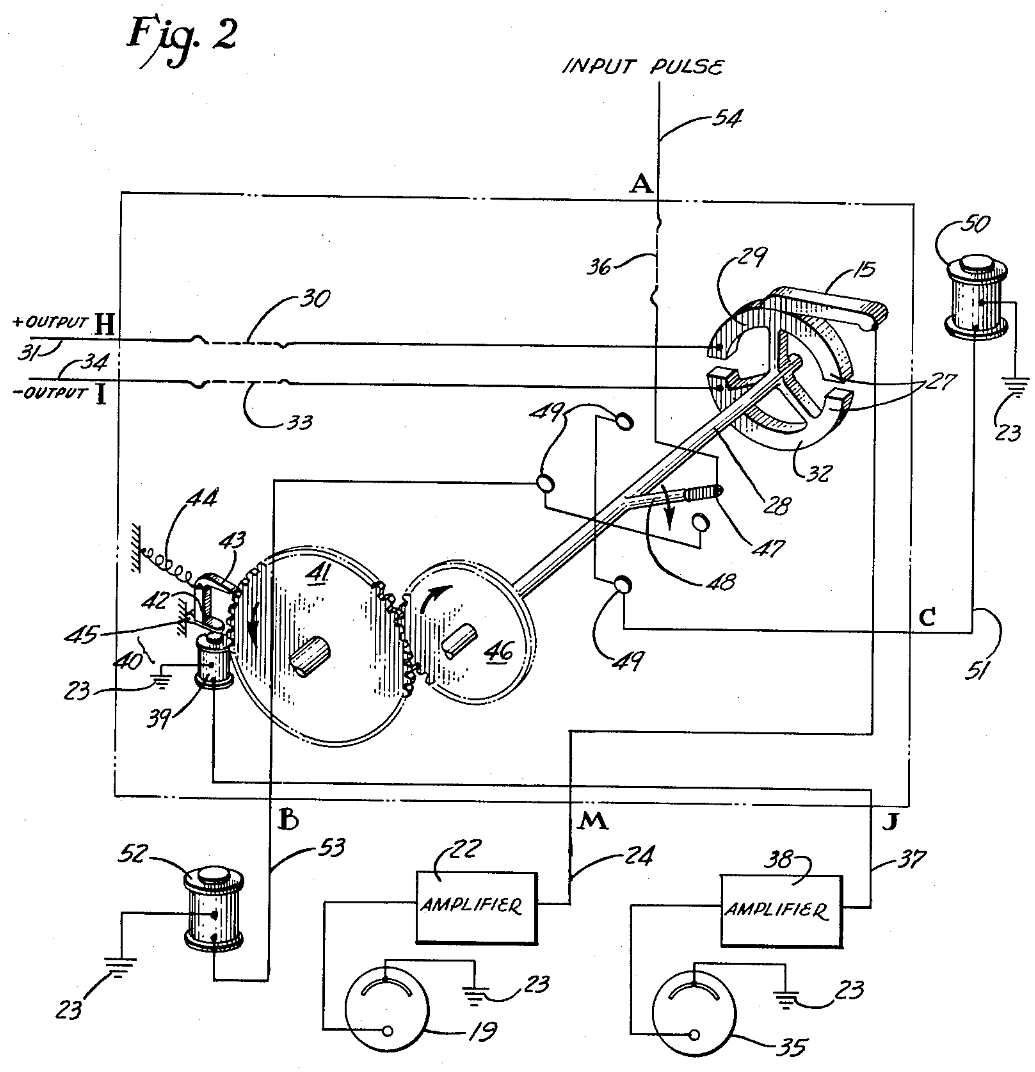
Figure 2 is a perspective illustration of the relay used in the embodiment along with its accompanying wire diagram.

Disposed approximately in the middle of the span of the tape cam 1 and supported slightly above the center line of the row of information holes 18 is an output photocell 19. A source of light X is positioned below the tape cam 1 and is directed to focus its light rays onto the output photocell 19. As the tape cam is progressed along its span, the output photocell 19 becomes momentarily energized any time an information hole 18 permits the light rays to impinge thereon. This resulting pulse from output photocell 19, one terminal of which connects to ground 23, is sent through circuit 24 containing output amplifier 22 to terminal M of compound stepping relay 25. As shown in Figure 2, terminal M is connected to a brush 15 held against a commutator ring 27. Commutator ring 27 is secured to rotate with stepping relay shaft 28. Top half 29 of the commutator ring 27 is connected at terminal H by a flexible portion 30 which is, in turn, connected to a positive output channel lead 31 of the sine tape cam system. Bottom half 32 of the commutator ring 27 is connected at terminal I by a second flexible portion 33 which is, in turn, connected to a negative output channel lead 34 of the sine tape cam system.

Assuming it is desired to compute the sine of an angle up to 360°, as in the embodiment of this invention, in order to save tape it is only necessary that the information holes 18 in the tape cam 1 be spaced to represent the sine of an angle from 0 to 90°. The tape cam 1 can then be reversed and will furnish sine values between 90° and 180° by playing backward. To provide the appropriate outputs the tape cam is reversed again at 180° and 270°. It should be pointed out here that use of an intermittent drive allows these reversals without loss of time.

The reversal of the direction of the tape cam 1 at 90° and 270° is accompanied by the reversal of the output pulse to the opposite output channel lead. Consequently, the algebraic sum of the pulses in the positive and negative output channel leads 31 and 34 gives the value of the sine of the angle at any instant.

A second photocell, designated the switch photocell 35 is provided to instigate this required reversal of tape direction and output sign. Switch photocell 35 is disposed above the tape cam adjacent to output photocell 19, and on a line between two terminating holes 14 placed at each end of the tape cam representing 0 and 90°. A second light source Y, below the tape cam 1, is so disposed that whenever a terminating hole 14 passes between the second light source Y and switch photocell 35, switch photocell 35, one terminal of which leads to ground 23, becomes momentarily energized. The resulting electrical pulse is sent through a second amplifier 38, contained in circuit 37, to terminal J of compound stepping relay 25. Referring to Figure 2, this pulse energizes a relay solenoid 39. The other terminal of relay solenoid 39 leads to ground 23.

A relay pawl 40 is located above relay solenoid 39 and on the side of relay stepping gear 41. Relay pawl 40, comprised of relay arm 42 and relay finger 43, is normally held in a disengaged position away from the teeth of relay stepping gear 41 by means of relay spring 44. However, when the relay solenoid 39 becomes energized it pulls the relay pawl 40 in a downwardly direction angularly about a pawl pivot 45.

This action causes the relay pawl 40 to engage a tooth on relay stepping gear 41 and to rotate the relay stepping gear so that relay shaft gear 46, meshing therewith, will rotate a quarter turn. Contact end 47 of relay switch arm 48, rigidly linked to rotate with relay shaft gear 46, will thus revolve clockwise to the next of four equally spaced stationary contacts 49 of the compound stepping relay 25. Alternate stationary contacts of this arrangement are interconnected. Then terminal C, of one pair of stationary contacts, is connected to rear drive solenoid 50 by rear solenoid lead 51. Terminal B, of the other pair of stationary contacts, is connected to front drive solenoid 52 by front solenoid lead 53. Both front and rear drive solenoids are connected to ground 23.

An independent variable pulse generator 20, provided with a frequency control 21, feeds pulses into a sine tape cam system input lead 54 which lead is connected to terminal A of compound stepping relay 25. Terminal A is connected through a flexible portion 36 to the outer end 47 of relay switch arm 48. Hence, it is clear that the activating of the switch photocell 35 by the light rays of light source Y passing through a terminating hole 14 in the moving tape cam 1 results in the sine tape cam system input lead 54 switching to energize the opposite drive solenoid.

The energizing of either the front or rear drive solenoids 52, 50, causes its associated drive pawl 55 and 56, normally restrained free from the teeth of stepping gear 7 and 16 by springs 57 and 58, to be pivoted about axis 59 and 60 respectively, engaging a tooth of drive stepping gear 7, or 16, and thus driving the tape cam 1 a given fixed increment. In this embodiment, information holes 18 are punched on the tape cam 1 in relation to the incremental drive, so that the focal point of light source X impinges through the information holes 18 on the tape cam 1 when the tape cam is stopped and passes between the information holes when the tape cam is in motion.

Referring back to compound stepping relay 25, the angular relationship of the four stationary contacts 49 to the top and bottom halves 29, 32 of the commutator ring 27, is such that a 180° rotation of the stepping relay shaft 28, or two activations of direction switch 35, will switch the pulse resulting from the activation of output switch 19 into the opposite sine tape cam system output channel.

The operation of the sine tape generator is as follows: Assume the sine generator is set for a zero angle and indicates the required zero sine value. An independent variable actuator generates properly formed direct current pulses at a standard frequency. These input pulses, each pulse representing, for example, six seconds of arc, are fed through compound stepping relay 25 to actuate the rear drive solenoid 50 to move the tape incrementally forward past the output photocell 19. The output photocell becomes energized every time an information hole 18 passes and sends the resulting electrical pulse, representing, for example, a sine increment of $2.9\times10^{-5}$ through compound stepping relay 25 to the positive output channel lead 31. When the tape has moved through a length corresponding to 90°, the switch photocell 35 becomes momentarily energized by light rays from source Y impinging through terminating hole 14. The relay switch arm 48 thus is caused to rotate a quarter turn. The input pulse to the generator is now switched to actuate the front drive solenoid 52 to move the tape incrementally backward past the output photocell 19. Simultaneously with this reversal in direction of the movement of the tape the output pulse from output photocell 19 is switched by means of commutator ring 27 from the positive output channel lead 31, which at this instant is recording a value of plus 1, to feed into the negative output channel lead 34. Thus the algebraic sum of these two output channels, representing the numerical value of the sine, gradually decreases in magnitude to zero as the tape moves through a length corresponding to an angle from 90 to 180°. At 180°, the switch photocell is again energized by the passing of a terminating hole 14, the stepping relay shaft rotates another quarter turn reversing the direction of travel of the tape. The output photocell 19, however, continues to send pulses to the negative output channel 34 which gradually builds up to record a value of minus 1 at 270°. At 270° both reversal of the direction of the tape and reversal of the output channels is again instigated by the switch photocell 35 to give the value of the sine to 360°.

Figure 3:
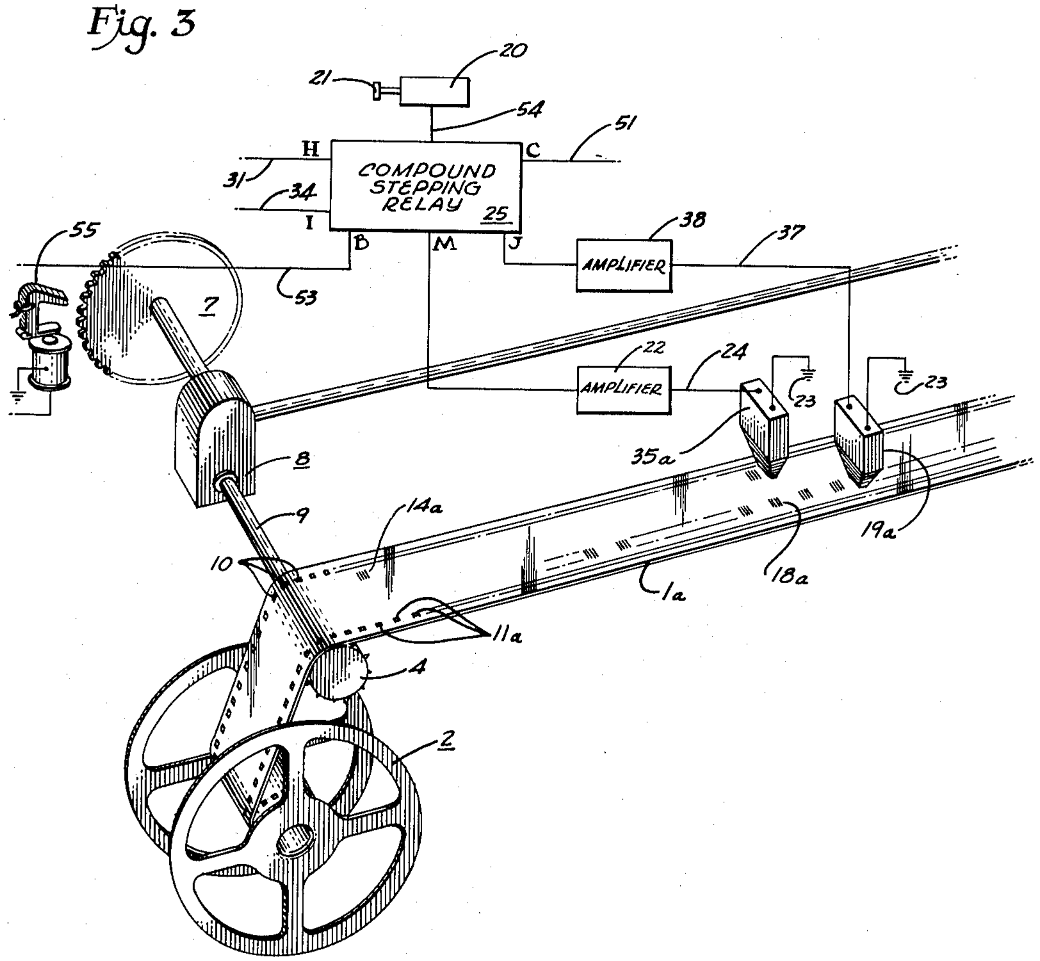
Figure 3 is a perspective diagrammatic illustration of a second embodiment of the invention.

Another embodiment of the invention has been illustrated in Figure 3 where like numbers with a suffix are used for parts previously described. For this case, tape **1*a* is made of steel and having recorded thereon a row of properly spaced magnetic signal areas indicated by spots 18*a*. An output magnetic pickup 19*a*, comprised of a coil, is so disposed as to generate a pulse when cut by the field of the magnetic recording as the tape is progressed past thereof. Likewise switch magnetic pickup 35*a* is provided to generate a switching signal when cut by the field of the terminating signal areas 14*a*. The magnetic signal areas for this cam are always recorded in relation to the sprocket holes 11*a*** so that the magnetic pickups lie between the signal areas when the tape cam is stopped and scan the signal areas when the tape cam is in motion.

It will now appear to those skilled in the art that other recorded media could be used with an appropriate scanning head. For example, a standard teletype paper tape, embossed cellophane, or even recorded drums might be employed.

Thus the nomenclature "linear cam," which has been used previously in this discussion as a more descriptive wording of the recording medium and which is used frequently in the ensuing claims, in light of the above examples, is hereby defined for clarity as an extended track which has the property throughout that when traversed a fixed linear increment it moves through a fixed angular increment.

It is desirable in all these cases to employ an intermittent drive, as in this embodiment, and to have the signals recorded on the tape in the same position relative to the drive sprocket holes, say between two holes. In the ensuing discussion the use of an incremental drive for the recorded medium will be referred to as "static scanning," as contrasted with continuous drive for the recorded medium which can be referred to as "dynamic scanning."

It is desirable to use static scanning of the recorded medium because it permits generation of a function at a desired time-rate without wasting recording medium. The most economical use of the recording medium is to space the signals as closely as is practical where the change in the function is most rapid. Consequently, when using dynamic scanning, it is necessary to change the speed of the tape past the scanning head to change the time-rate of generating the function. However, certain methods of scanning, such as the scanning of a magnetic tape, as shown in Figure 3, where the rate of cutting magnetic lines is important, cannot be slowed up as the desired time-rate of generating the function is decreased. The use of static scanning solves this problem. The frequency of the independent variable input pulse to the generator system, which actuates the stepping drive gear solenoids, can be varied to give the desired time-rate of generation of the function. For this case, the relation of the signals in the tape to the sprocket holes is such that the tape stops between signals and is in motion during the scanning of signals, then the rapid movement of the magetic tape past its scanning head during each increment meets the requirement of cutting the tape magnetic field at a high rate.

When it is desirable, as in the embodiment of the invention describing the sine generator, to save tape by repeatedly reversing the tape cam to obtain the cyclical values, the use of static scanning permits these reversals of the tape to be made without loss of time.

When using a tape recorded medium method of generating a function, the dependent variable is not generated continuously but by discrete steps of equal magnitude. The smaller the magnitude of the step the greater the accuracy of the function generated. In order to keep the length of the tape used to a minimum, the accuracy of generating the function is held only to the degree required. The scanning of each information hole changes the magnitude of the function by the amount of the step; thus assuming the minimum spacing of the information holes in the tape is to be an eighth of an inch, only 563 feet of tape would be required to give the sine value to an accuracy $2.9\times10^{-5}$.

When generating some functions it is highly desirable to be able to start computations at a particular value of the dependent variable in order to satisfy initial conditions. The tape medium method of generating a function employing static scanning permits the tape to be set at a given value easily and accurately since the tape moves at given discrete increments as a result of each independent variable pulse fed into the generator. Likewise, the mounting head senses the signals on the tape as discrete dependent variable pulses which can be easily counted.

With this method of generating a function it is easy to generate any other function using the same mounting, drive and pickup apparatus by replacing the tape cam. If a reversal of the direction of the tape or a change in the sense of magnitude of the output is required, properly placed signals, cooperating with appropriate switches, will operate to give the desired result.

There is thus provided a novel means and method whereby a function can be generated to any predetermined accuracy.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features. It is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A function generator comprising a linear cam, a signal generating record on said cam representing a function, means for progressing said cam in either direction and in uniform increments in accordance with the sense and amount of an independent variable, and means for generating an output signal in accordance with the direction and amount of movement of said record.

2. A function generator comprising a linear cam, an independent variable actuator, a signal generating record on said cam representing a function, means for progressing said cam in uniform increments in accordance wtih discrete signals from said independent variable actuator, each signal on said generating record occurring at a fixed relative position with respect to said increment, and means for generating an output signal resulting from the movement of said record.

3. A function generator comprising a linear cam, an independent variable actuator, a first signal generating record on said cam representing a function, a second signal generating record on said cam representing a switching signal, means for progressing said cam in uniform increments in accordance with discrete signals from said independent variable actuator, each signal on said generating records occurring at a fixed relative position with respect to said increment, means for generating an output signal resulting from the movement of said first record, means for reversing the direction of travel of said cam, means for generating a switching signal resulting from movement of said second record, means for utilizing said switching signal to instigate said means for reversing the direction of travel of said cam.

4. A function generator comprising a linear cam, an independent variable actuator, a first signal generating record on said cam representing a function, a second signal generating record on said cam representing a switching signal, means for progressing said cam in uniform increments in accordance with discrete signals from said independent variable actuator, each signal on said generating records occurring at a fixed relative position with respect to said increment, means for generating an output signal resulting from the movement of said first record, means for reversing the direction of travel of said cam, means for generating a switching signal resulting from movement of said second record, means for utilizing said switching signal to instigate said means for reversing the direction of travel of said cam, said cam being reversed by said latter means in the same time interval as the increment interval.

5. A function generator comprising a linear cam, an independent variable actuator, a first signal generating record on said cam representing a function, a second signal generating record on said cam representing a switching signal, means for progressing said cam in uniform increments in accordance with discrete signals from said independent variable actuator, each signal on said generating records occurring at a fixed relative position with respect to said increment, means for generating an output signal resulting from the movement of said first record, a positive and negative output channel, means for conveying said output signal to one or the other of said output channels, means for generating a switching signal resulting from movement of said second record, means for utilizing said switching signal to instigate said means for conveying said output signal to the opposite of said output channels.

6. A function generator comprising a linear cam, an independent variable actuator, a signal generating record on said cam representing a function, means for progressing said cam in uniform increments in accordance with discrete signals from said independent variable actuator, means responsive to a change in the frequency of said independent variable signals to change the time-rate of progression of said record, and means for generating an output signal resulting from the movement of said record.

7. A function generator comprising a linear cam, an independent variable actuator, a signal generating record on said cam representing a function, means for progressing said cam in uniform increments in accordance with discrete signals from said independent variable actuator, means for generating an output signal resulting from the movement of said record, said means positioned to generate said signal only during said incremental movement of said cam.

8. A function generator comprising a linear cam, an independent variable actuator, a signal generating record on said cam representing a function, means for progressing said cam in uniform increments in accordance with discrete signals from said independent variable actuator, means for generating an output signal resulting from the movement of said record, said means positioned to sense said signal only when said record is stopped between said incremental movements.

9. A function generator comprising a linear cam, an independent variable actuator, a first signal generating record on said cam representing a function, a second signal generating record on said cam representing a switching signal, means for progressing said cam in uniform increments in accordance with discrete signals from said independent variable actuator, means for generating an output signal resulting from the movement of said first record, means for reversing the direction of travel of said cam, a positive and negative output channel, means for conveying said output signals to the opposite of said output channels, means for generating a switching signal resulting from movement of said second record, means for utilizing said switching signal to instigate said means for both reversing direction of travel of said cam and conveying said output signals to the opposite of said output channels.

10. A function generator comprising a tape cam, two drive sprockets, said tape cam spanning said drive sprockets, information holes on said cam representing a function, terminating holes on said cam representing switching signals, a stepping gear rotatably connected to first of said drive sprockets for incrementally driving said tape cam forward, a second stepping gear similarly connected to second of said drive sprockets for driving said tape cam backward, an actuator generating independent variable pulses, a frequency control on said actuator, solenoid and pawl drives associated with each of said stepping gears, a first switching means for connecting said actuator to either one or the other of said solenoid and pawl drives, said solenoid and pawl drives progressing said tape in uniform increments in accordance with said pulses, said holes on said tape cam occurring at a fixed relative position with respect to said increment, a first mounting head for generating an output signal resulting from the movement of said information holes past thereof, a positive and negative output channel, the algebraic sum of said signals in said output channels representing the numerical value of the dependent variable, a second switching means for conveying said output signals to opposite of said output channels, a second mounting head for generating switching signals resulting from the movement of said terminating holes past thereof, means for utilizing said switching signals to instigate said switching means for both reversing direction of travel of said tape cam and conveying of said output signals to opposite of said output channels.

11. A function generator comprising a tape cam, two drive sprockets, said tape cam spanning said drive sprockets, information holes on said cam representing the sine of an angle to 90°, a stepping gear rotatably connected to first of said drive sprockets for incrementally driving said tape cam forward, a second stepping gear similarly connected to second of said drive sprockets for driving said tape cam backward, an actuator generating independent variable pulses, a frequency control on said actuator, solenoid and pawl drives associated with each of said stepping gears, a first switching means for connecting said actuator to either one or the other of said solenoid and pawl drives, said solenoid and pawl drives progressing said tape in uniform increments in accordance with said pulses, said holes on said tape cam occurring at a fixed relative position with respect to said increment, a first light source, a first photocell so mounted as to generate output signals when said information holes pass over said first light source, a positive and negative output channel the algebraic sum of whch represents the numerical value of the sine, a second switching means for conveying said output signals to opposite of said output channels, a second light source, a second photocell so mounted as to generate a switching signal when said terminating hole passes over said second light source, means for utilizing said switching signals to instigate said switching means for both reversing direction of travel of said tape cam for generating sines of angles greater than 90° and conveying said output signals to opposite of said output channels to change the sense of the magnitude of the sine value generated.

12. A function generator comprising a tape cam, two drive sprockets, said tape cam spanning said drive sprockets, a first magnetic signal record on said cam representing a function, a second magnetic signal record on said cam representing switching signals, a stepping gear rotatably connected to first of said drive sprockets for incrementally driving said tape cam forward, a second stepping gear similarly connected to second of said drive sprockets for driving said tape cam backward, an actuator generating independent variable pulses, a frequency control on said actuator, solenoid and pawl drives associated with each of said stepping gears, a first switching means for connecting said actuator to either one or the other of said solenoid and pawl drives, said solenoid and pawl drives progressing said tape in uniform increments in accordance with said pulses, a first mounting head for generating an output signal resulting from movement of said first magnetic signal record past thereof, a positive and negative output channel the algebraic sum of which represents the numerical value of the dependent variable, a second switching means for conveying said output signals to opposite of said output channels, a second mounting head for generating switching signals resulting from the movement of said second magnetic signal record past thereof, said magnetic signal records on said tape cam related to said increment such that said magnetic signal records always occur at substantially the midpoint of said incremental movement, means for utilizing said switching signals to instigate said switching means for both reversing direction of travel of said tape cam and conveying of said output signals to opposite of said output channels.

13. A function generator comprising a linear cam, an independent variable actuator, means for driving said linear cam in uniform increments in accordance with discrete signals from said independent variable actuator, a first pulse producing record on said cam representing a function, a second pulse producing record on said cam representing a switching signal, the pulse producing portions of said records being placed on said records in uniform relationship to the extent of said increments, means for reversing the direction of travel of said cam, a first record reproducing device positioned to generate output pulses from movement of said first record past said first device, a positive and negative output channel, means for conveying said output pulses to the opposite of said channels, a second record reproducing device positioned to generate switching pulses from the movement of said second record past said second device, means for utilizing said switching pulses to instigate said means for both reversing direction of travel of said cam and conveying said output pulses to the opposite of said output channels.

14. Apparatus in accordance with claim 12 wherein both said record reproducing devices are positioned over a pulse producing portion of their respective records when said cam is at rest.

15. Apparatus in accordance with claim 12 wherein both said record reproducing devices are positioned outside of a pulse producing portion of their respective records when said cam is at rest.

16. A function generator comprising a linear cam, an independent variable actuator, means for driving said linear cam in uniform increments in accordance with discrete signals from said independent actuator, a pulse producing record on said cam representing a function, the pulse producing portions of said record being placed on said record in uniform relationship to the extent of said increments, a record reproducing device positioned to generate output pulses from movement of said record past said device.

17. Apparatus in accordance with claim 16 wherein said device is positioned over a pulse producing portion of said record when said cam is at rest.

18. Apparatus in accordance with claim 16 wherein said device is positioned outside of a pulse producing portion of said record when said cam is at rest.

19. In a computing system, the method of scanning a record medium having spaced pulse forming signals recorded thereon requiring a predetermined medium speed to properly actuate an adjacent signal reproducer, which comprises intermittently progressing said medium in uniform increments in accordance with the value of an independent variable at an overall integrated rate less than that required to cause said signal records to properly actuate said reproducer, stopping said medium with said reproducer between said signal records, and moving said medium between stops at a rate equal to or greater than said predetermined speed to cause said signal records to properly actuate said reproducer to produce a pulse.

20. In a computing system, the method of scanning a record medium having spaced pulse forming signals recorded thereon requiring a predetermined medium speed to properly actuate an adjacent signal reproducer, which comprises intermittently progressing said medium in uniform increments in accordance with the value of an independent variable at an overall integrated rate less than that required to cause said signal records to properly actuate said reproducer, stopping said medium with said reproducer between said signal records, moving said medium between stops at a rate equal to or greater than said predetermined speed to cause said signal records to properly actuate said reproducer to produce a pulse, and reversing the direction of progression of said medium in accordance with a reversal of said value immediately following a stop only without prolonging said stop, to provide a series of uniformly spaced pulses.

21. Apparatus in accordance with claim 2 wherein the overall integrated rate of progression of said cam by said cam progression means is less than that required to cause said record to properly actuate said output signal generating means, wherein said signal generating means is positioned outside of a signal generating record when said cam is at rest, and wherein said cam progression means includes means for moving said cam at a speed between stops sufficiently high to cause said record to properly actuate said signal generating means.

22. Apparatus in accordance with claim 13 wherein the overall integrated rate of drive of said cam by said cam driving means is less than that required to cause said first pulse producing record to produce a proper pulse in said first record reproducing device, wherein said first record reproducing device is positioned outside of a pulse producing portion of said first pulse producing record when said cam is at rest, and wherein said cam driving means includes means for moving said cam at a speed between stops sufficiently high to cause said first pulse producing record to properly actuate said first record reproducing device to produce a pulse.

References Cited in the file of this patent

UNITED STATES PATENTS 2,436,178 Rajchman ------------- Feb. 17, 1948